United States Patent [19]
Niwa

[11] 4,080,661
[45] Mar. 21, 1978

[54] ARITHMETIC UNIT FOR DFT AND/OR IDFT COMPUTATION

[75] Inventor: Kunihiko Niwa, Tokyo, Japan

[73] Assignee: Nippon Electric Co., Ltd., Tokyo, Japan

[21] Appl. No.: 678,568

[22] Filed: Apr. 20, 1976

[30] Foreign Application Priority Data

Apr. 22, 1975 Japan .................................. 50-49322

[51] Int. Cl.² ............................................. G06F 15/34
[52] U.S. Cl. ................... 364/726; 324/77 B
[58] Field of Search ........................ 235/156, 152, 164; 324/77 B, 77 D

[56] References Cited
U.S. PATENT DOCUMENTS

| | | | |
|---|---|---|---|
| 3,683,162 | 8/1972 | Jacob et al. | 235/156 |
| 3,803,390 | 4/1974 | Schappman | 235/152 |
| 3,961,167 | 6/1976 | Mills | 235/152 |

*Primary Examiner*—David H. Malzahn
*Attorney, Agent, or Firm*—Sughrue, Rothwell, Mion, Zinn and Macpeak

[57] ABSTRACT

An arithmetic unit for performing the operation of multiplying input data by successive powers of a constant and accumulating the products represented by $$\sum_{k=0}^{N-1} x_k \alpha^{N-k},$$

where $\alpha$ is a constant, is disclosed. The arithmetic unit includes a recursive path which does not necessitate a multiplier, and operations which really necessitate multiplication are carried out only when the input data have substantially entered this recursive path thereby substantially reducing the number of multiplications required. The arithmetic unit has particular application in performing DFT (Discrete Fourier Transform) or IDFT (Inverse Discrete Fourtier Transform).

8 Claims, 10 Drawing Figures

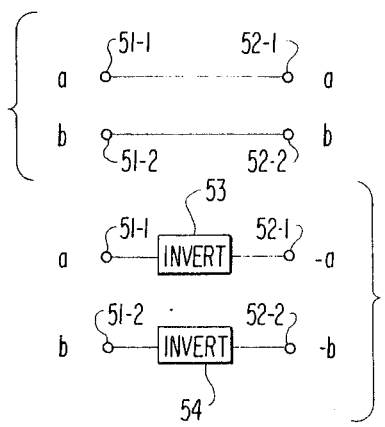
FIG.5A (X(1))
FIG.5B (X(-1))
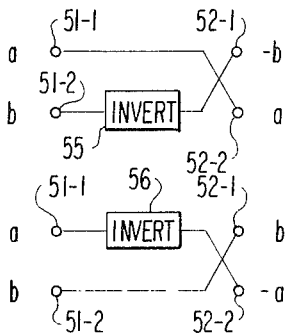
FIG.5C (X(j))
FIG.5D (X(-j))
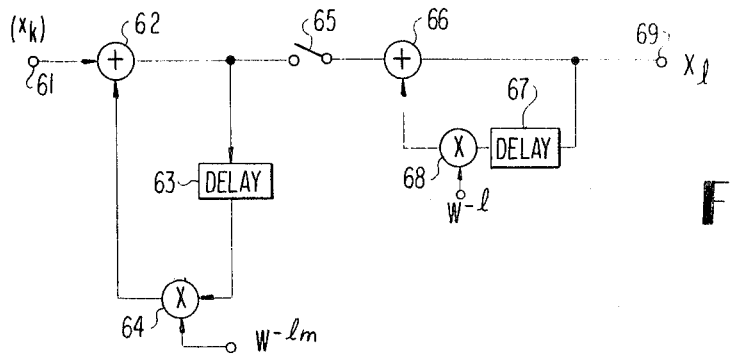
FIG 6
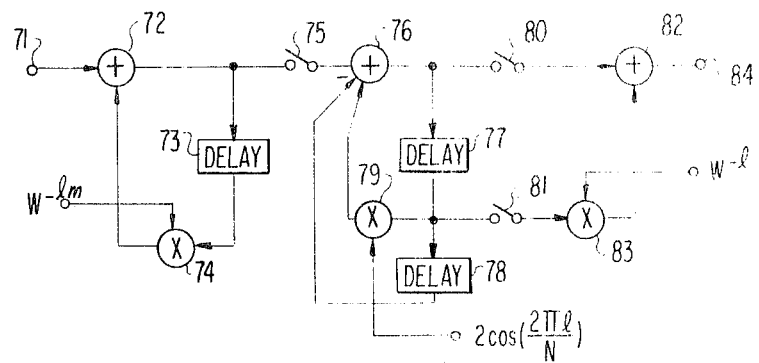
FIG 7

ARITHMETIC UNIT FOR DFT AND/OR IDFT COMPUTATION

The present invention relates to an arithmetic unit, and more particularly to an arithmetic unit for performing the multiplication of an N-point input digital data series $\{x_k\}$ ($k = 0, 1, 2, \ldots, x_{N-1}$) by successive powers of a constant $\alpha$ and for performing the accumulation of the products.

One typical example of such operations is DFT (Discrete Fourier Transform) or IDFT (Inverse Discrete Fourier Transform). The DFT is an operation for detecting a particular frequency component from a time series of sample values, while the IDFT is an operation for deriving a time series of sample values having given frequency components. These operations are frequently needed in various fields of communications and signal processing. For instance, currently in each telephone exchange, a multifrequency receiver is provided, and the interchange of various control information between the exchanges is carried out according to a multi-frequency signaling system. In this signaling system, the control information is represented by a signal consisting of a combination of frequencies selected out of a number of predetermined frequencies for transmission and reception. Accordingly, upon reception of such a signal, it is necessary to detect what frequencies have been transmitted. As described above, since the DFT is the operation for detecting a particular frequency component from a time series of sample values, it can be applied to the multi-frequency signal receiver.

With regard to the DFT and IDFT, detailed description is made in Chapter 6 of the text book by Bernard Gold et al entitled *DIGITAL PROCESSING OF SIGNALS* published in 1969 by McGraw-Hill Book Co., Inc. (Reference 1), and so, their description will be briefly given below. That is, when N-point input digital data $\{x_k\}$ ($k = 0, 1, \ldots, N-1$) are given, the DFT is calculated by the following equation:

$$X_l = \sum_{k=0}^{N-1} x_k W^{kl} = \sum_{k=0}^{N-1} x_k (W^{-l})^{N-k} \quad (1)$$

$$(l = 0, 1, \ldots, N-1)$$

where
$$W = \exp(-j2\pi/N) \text{ and } j = \sqrt{-1} \quad (2)$$

On the contrary, when $\{X_l\}$ ($l = 0, 1, \ldots, N-1$) are given as input data, the IDFT is calculated by the following equation:

$$x_k = \frac{1}{N} \sum_{l=0}^{N-1} X_l W^{-kl} = \frac{1}{N} \sum_{l=0}^{N-1} X_l (W^k)^{N-l} \quad (3)$$

$$(k = 0, 1, \ldots, N-1)$$

Thus, the constant $\alpha$ (as referred to in the appended claims) takes the value of $W^{-l}$ in the case of the DFT, and the value of $W^k$ in the case of the IDFT.

Although the constant $\alpha$ is not always $W^{-l}$ or $W^k$ in the broad concept of the present invention, for convenience, the invention is explained with respect to the DFT, that is, with respect to the case of $\alpha = W^{-l}$ in the following description.

Since the digital data $x_k$ generally consist of complex numbers, in order to obtain the DFT in equation (1), in general N complex multiplications and N complex additions must be carried out. However, a multiplier in a digital arithmetic unit has a very complicated circuit structure and a large amount of hardware, and requires much time for its operation as disclosed on page 417, FIGS. 10 and 11 of the article by Leland B. Jackson et al entitled "An Approach to the Implementation of Digital Filters" published in *IEEE TRANSACTIONS ON AUDIO AND ELECTROACOUSTICS*, Vol. AU-16, No. 3, pp. 413-421, September 1968 (Reference 2). Therefore, the reduction of the number of multipliers and multiplications greatly contributes to the simplification, reduction in size and increased operational speed of the apparatus. As one approach for reducing the number of multiplications in the DFT, the Goertzel algorithm as disclosed on pages 171 and 172 of Reference 1 has been known. In this algorithm, by modifying equation (1) so as to multiply real coefficients instead of multiplying complex coefficients, the number of practical multiplications is reduced to about one-half in comparison to the case where equation (1) is directly calculated. However, even with such approach, the number of multiplications was not sufficiently decreased.

SUMMARY OF THE INVENTION

It is, therefore, an object of the present invention to provide an arithmetic unit in which the number of multiplications can be reduced further than in the case of employing the Goertzel algorithm and a simplification and increased operational speed of the circuit can be achieved.

The present arithmetic unit comprises a first operation means consisting of one or more stages of serially connected delay elements, a simplified multiplier means for receiving an output of a final stage of the delay elements and multiplying it by a simple coefficient and an adder means fed with an input digital data series $\{x_k\}$ and an output of the simplified multiplier means as its first and second inputs, respectively, for supplying its output to an initial stage of the delay elements, and a second operation means for performing the operation of multiplying outputs of respective stages of the delay elements by successive powers of a constant $\alpha$ and accumulating the products after the input digital data series $\{(x_k)\}$ has been entirely fed to an input terminal of the first operation means.

BRIEF DESCRIPTION OF THE DRAWINGS

The present invention will be described in more detail in conjunction with the accompanying drawings, in which:

FIGS. 5A, 5B, 5C and 5D are diagrams of a construction of a simplified multiplier means in FIG. 4;

FIG. 6 shows a diagram of a second embodiment of the present invention; and

FIG. 7 shows a diagram of a third embodiment of the present invention.

DESCRIPTION OF THE PREFERRED EMBODIMENTS

At first, a multi-frequency signaling system will be described with reference to FIG. 1 which illustrates one structural example of a multi-frequency signal receiver to which the present invention may be applied. It will be understood from the following description, however, that the invention has broader application than telephone exchanges which is given here merely by way of illustrative example.

Between telephone exchanges, various control signals and digit signals are interchanged to achieve the interconnection of telephone lines. In the MF (multi-frequency) signaling system, these signals are represented by combinations of predetermined frequencies. More particularly, two frequencies selected from six frequencies consisting of 700 Hz, 900 Hz, 1100 Hz, 1300 Hz, 1500 Hz and 1700 Hz are combined to represent 15 kinds of different signals. The receiver of the signals must necessarily detect the two frequencies actually selected out of the six frequencies for transmission. The multi-frequency signal receiver in FIG. 1 performs this function in a digital manner.

Figure 1:
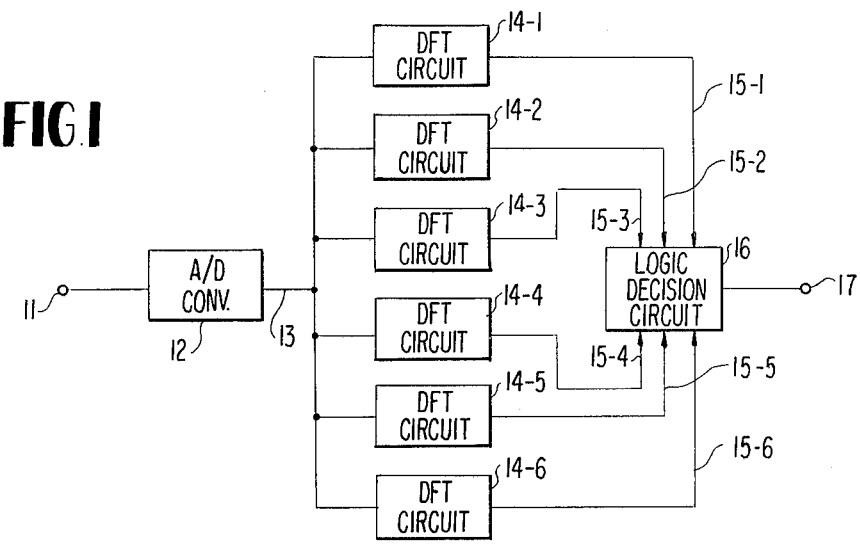
FIG. 1 shows a schematic block diagram of a construcion of a multi-frequency signal receiver.

In FIG. 1, an MF signal is applied to an input terminal 11, and it is converted into a digital signal 13 by an analog-to-digital converter 12. This digital signal 13 is fed to DFT arithmetic circuits 14-1 ~ 14-6. The DFT arithmetic circuit 14-1 is constructed to detect a frequency component of 700 Hz, and likewise, the DFT arithmetic circuits 14-2 ~ 14-6 are designed to detect the frequency components 900 Hz, 1100 Hz, 1300 Hz, 1500 Hz and 1700 Hz, respectively. The output signals 15-1 ~ 15-6 of the respective DFT arithmetic circuits represent the magnitude of the respective frequency components, and these output signals are given to a logic decision circuit 16, where a decision is made to determine the two frequencies actually transmitted and, as a result, a decision output signal 17 is obtained from its output terminal. The output signal 17 is fed to a switching circuit in a telephone exchange, and by closing the switching circuit, a desired connection of a communication path is made. One example of the multi-frequency signal receiver with such a structure is described in an article by Ivan Koval et al entitled "Digital MF Receiver Using Discrete Fourier Transform" in IEEE Transactions on Communications, Vol. Com-21, No. 12, pp. 1331-1335, December 1973 (Reference 3). Inasmuch as the construction itself of the multi-frequency signal receiver has no direct bearing on the subject matter of the present invention, more detailed description of the construction will be omitted here. However, one remarkable point disclosed in Reference 3 is that upon carrying out DFT, it is attempted to reduce the number of multiplications by employing the Goertzel algorithm as fully described hereunder.

Now, the Goertzel algorithm will be described in more detail with reference to FIGS. 2 and 3. Equation (1) representing the DFT can be modified as follows:

$$X_l = \sum_{k=0}^{N-1} x_k (W^{-l})^{N-k} = \qquad (4)$$

$$\{\ldots[(x_0 W^{-l} + x_1)W^{-l} + x_2]W^{-l} + \cdots\cdots + x_{N-1}\} W^{-l}$$

Figure 2:
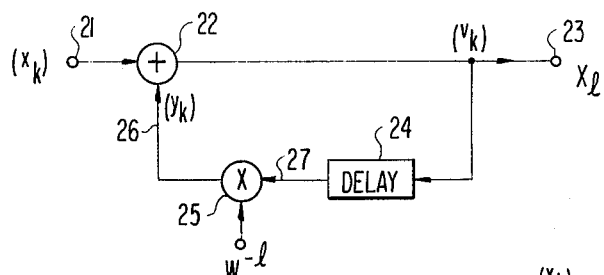
FIG. 2 shows a schematic circuit diagram of one example of a circuit for performing a DFT.

In FIG. 2 which shows one example of the circuit for realizing equation (4), the circuit shown therein is a kind of recursive digital filter in which input digital data $\{x_k\}$ ($k = 0, 1, \ldots, N-1$) are successively supplied to an input terminal 21. It is assumed here that at the initial state, the contents of a delay element 24 is zero. An adder means 22 adds the input data $\{x_k\}$ and data $\{y_k\}$ appearing at a feedback path 26 and gives a sum $\{v_k\}$ at its output. The delay element 24 delays the data $\{v_k\}$ by one datum period. An output signal 27 of the delay element 24 is multiplied by a coefficient $W^{-l}$ with a multiplier means 25 to obtain said data $\{y_k\}$. When the data $\{x_k\}$ are successively fed to the input terminal 21 of the circuit in FIG. 2, the data $v_0, v_1, v_2, \ldots$ take the values $x_0$, $x_0 W^{-l} + x_1$, $(x_0 W^{-l} + x_1)W^{-l} + x_2, \ldots$, respectively. So, it will be understood that after a final datum $x_{N-1}$ has been supplied, $v_{N-1}$ becomes equal to $X_l$ in equation (4). If the coefficient $W^{-l}$ to be multiplied by the multiplier means 25 in FIG. 2 is changed, another DFT component can be obtained in the same manner. It is to be noted that since the input data $\{x_k\}$ and the coefficient $W^{-l}$ are generally complex numbers, an additional adder means 22 and delay element 24 are needed as practical hardware both for the real and the imaginary part, and four multiplier means must be provided for multiplying the real part and the imaginary part of the data by the corresponding parts of the coefficient. In FIG. 2, however, for simplicity of the drawings, each of the aforementioned means is represented as a single structural element.

Now, if the transfer function of the recursive digital filter in FIG. 2 is represented by the Z-transform H(Z), the following representation is obtained:

$$H(Z) = \frac{1}{1 - W^{-l}Z^{-1}} \qquad (5)$$

In order to compute the DFT with the digital filter shown in FIG. 2, complex multiplications and complex additions are required.

However, equation (5) above can be modified as follows:

$$H(Z) = \frac{1 - (W^{-l})^* Z^{-1}}{(1 - W^{-l}Z^{-1})\{1 - (W^{-l})^* Z^{-1}\}} = \qquad (6)$$

$$\frac{1 - W^l Z^{-1}}{1 - 2\cos\left(\frac{2\pi l}{N}\right) Z^{-1} + Z^{-2}}$$

where a symbol * represents a complex conjugate.

Figure 3:
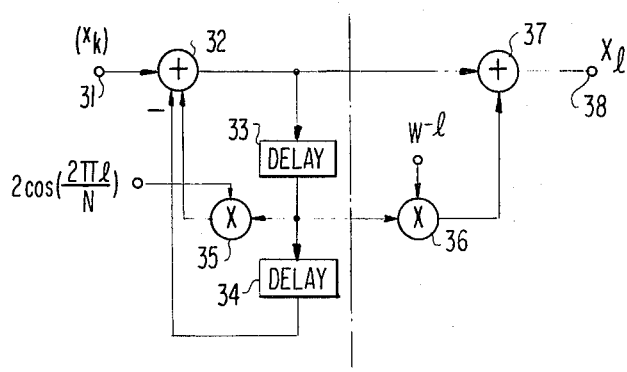
FIG. 3 shows a circuit diagram of a circuit for realizing a Goertzel algorithm.

A circuit structure of this digital filter is illustrated in FIG. 3. As shown, the filter comprises an input terminal 31 to which complex digital data $\{x_k\}$ are applied, adder means 32 and 37, one-datum delay elements 33 and 34, multiplier means 35 and 36 for multiplying coefficients $2 \cos (2\pi l/N)$ and $-W^l$, respectively and an output terminal 38 for giving a computed DFT ($X_l$). Contrasting equation 6 with FIG. 3, the coefficient multiplied to the data by the multiplier means 35 is a real number $2 \cos (2\pi l/N)$ rather than a complex number. In addition, since the final output of this filter is the desired DFT, the operation of the circuit at the right-hand portion of the dotted and dashed line in FIG. 3 is required only once as the last operation.

Accordingly, the necessary multiplication is multiplications of the complex data by a real coefficient executed by the multiplier means 35 and one multiplication of the complex data by a complex coefficient executed by the multiplier means 36. In contrast to the fact that each multiplication of a complex number by a complex number needs four real multiplications and two real additions, each multiplication of a real number by a complex number necessitates only two real multiplications. This means that the number of multiplications can be reduced to about one-half in comparison to the case where equation (1) is directly computed. This is the basic concept of the Goertzel algorithm.

In the present arithmetic unit as described hereunder, the number of multiplications can be further reduced as contracted with the arithmetic unit constructed on the basis of the above-described Goertzel algorithm.

At first, equation (5) can be modified as follows:

$$H(Z) = \frac{\sum_{i=0}^{m-1} W^{-li} Z^{-i}}{1 - W^{-lm} Z^{-m}} \quad (7)$$

where $m$ is a positive integer satisfying the following equation (8), and generally a minimum positive integer satisfying equation (8) is selected therefor:

$$l \cdot m = \frac{N}{4} \times (interger) \quad (8)$$

Figure 4:
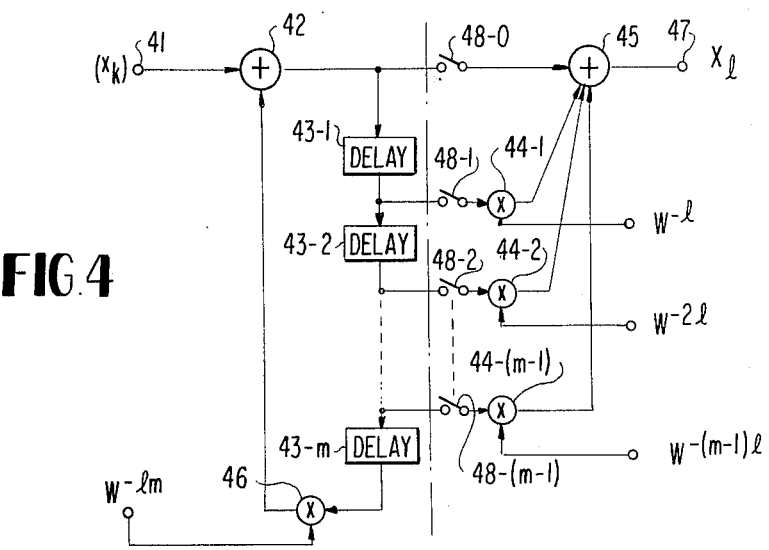
FIG. 4 shows a diagram of a first embodiment of the present invention.

In FIG. 4 which shows a first embodiment of the present invention, the present unit comprises a recursive path consisting of an input terminal 41, an adder means 42, $m$ delay elements 43-1, 43-2, ..., and 43-$m$, and a multiplier means 46, and a non-recursive path consisting of $(m-1)$ multiplier means 44-1, 44-2, ......, and 44-$(m-1)$, an adder means 45 and an output terminal 47. Here, it is to be noted that by the following equation (9) and the above equation (8), a coefficient $W^{-lm}$ multiplied in the recursive path in FIG. 4 takes any one of the values among $j$, $-1$, $-j$ and 1:

$$W^{-\frac{N}{4}} = \exp(j \frac{\pi}{2}) = j \quad (9)$$

For multiplying complex data by these values, it is only necessary to carry out the inversion of polarity and/or the interchange of a real part and an imaginary part, but not to carry out the ordinary multiplication. For instance, multiplying a given complex datum $(a + jb)$ by $j$, because $j(a + jb)$ is equal to $-b + ja$, and therefore, the multiplication of $(a + jb)$ by $j$ is equivalent to the operation of interchanging the real part $a$ and the imaginary part $b$ with each other and inverting the polarity of the interchanged real part.

In FIGS. 5A, 5B, 5C and 5D, respectively, shows examples of hardward implementation of the multiplier means 46 (of FIG. 4) for multiplying 1, $-1, j$ and $-j$, a real part of a multiplicand is given to an input terminal 51-1, while an imaginary part of a multiplicand is supplied to an input terminal 51-2. At an output terminal 52-1 appears a real part of the product, while at an output terminal 52-2 appears an imaginary part of the product. In these figures, reference numerals 53 to 56 indicate polarity inverter circuits for the input digital data. Though these polarity inverter circuits structurally differ from each other depending upon the format and the code form of the input data, in the case where the input digital data are given to the input in a serial form with the LSB (least significant bit) first, and where the code is represented by two's complement (for instance, the two's complement of binary number 11010 is given as 00110), the circuit shown in FIG. 8 on page 416 of Reference 2 can be employed. Whatever format and code form may be employed, the porality inverter circuit can be constructed by very simple hardware consisting of one flip-flop and a few gates or so. Therefore, it is seen that for the structure of the multiplier means 46 performing only multiplications of $\pm 1$ and $\pm j$, a complicated circuit like the ordinary multipliers is not needed at all.

Now returning again to FIG. 4, as described previously, an output signal appearing after all the input digital data $\{x_k\}$ were supplied to the digital filter of FIG. 4, becomes a desired DFT. Stated in more detail, in order to compute the DFT represented by equation (4), that is, $X_l$, in the non-recursive path of the filter (at the right-hand portion of the dotted and dashed line in FIG. 4), it is required to perform an operation only once when a last datum $x_{N-1}$ has entered the delay element 43-1. As a result, switches 48-0, 48-1, ........, and 48-$(m-1)$ are closed only once at that time. That is, the number of multiplications is only $(m-1)$. $m$ is an integer determined by equation (8), and is always equal to or less than N, and especially, if N is a multiple of 4, $m \leq$ N/4 is satisfied, so that the number of multiplications is reduced to less than ¼ as compared with the direct calculation of equation (1), and to less than ½ even in comparison to the Goertzel algorithm circuit of FIG. 3.

Next, the advantage of the present invention will be described in comparison to the above-mentioned prior art, by selecting the parameters in equation (1) as N = 512 and $l$ = 16. At first, it is pointed out that upon computing equation (1) directly, 512 complex multiplications are needed. In general, when two complex numbers $(a + jb)$ and $(c + jd)$ are multiplied by each other, four real multiplications are necessitated because $(a + jb)(c + jd)$ is equal to $(ac - bd) + j(bc + ad)$. For this reason, for 512 complex multiplications, it is necessary to perform $4 + 512 = 2048$ real multiplications. Whereas, in the method of the Goertzel algorithm (as shown in FIG. 3), 512 multiplications for multiplying the complex data by the real coefficient $2 \cos(2\pi l/N)$ in equation (6) and one complex multiplication performed in the multiplier means 36 of FIG. 3 are required. Since the multiplication of a complex datum $(c + jd)$ by a real coefficient $a$ satisfies the following equation (10), only two real multiplications are needed:

$$(c + jd)a = ac + jad .... \quad (10)$$

As a result, the total number of real multiplications is only $2 \times 512 + 4 \times 1 = 1028$. This value is about one-half of the number of multiplications of direct computation of equation (1).

In contrast, the number of multiplications with the present invention will be calculated. In the case of N = 512 and $l$ = 16, $m$ = 8 is determined on the basis of equation (8). Therefore, in the present invention, (8-1) complex multiplications, that is, only $4 \times 7 = 28$ real multiplications are required. This value is merely 1/73 in comparison to the direct computation of equation (1), and is merely 1/37 even in comparison to the Goertzel algorithm. In this way, with the present invention, the number of multiplications can be greatly reduced.

Now, an explanation is given on the control of the respective circuit elements in the unit shown in FIG. 4. Since all the circuit elements of FIG. 4 are digital, they are controlled by clock pulses. Word pulses for performing the separation of each of N-point input digital data and the data supplied into the circuit are derived from the clock pulses, and in response to the word pulses, all the operations are performed. Especially, if the form of the data is serial, bit pulses for controlling the respective bits are necessary, and by counting down these bit pulses the word pulses are obtained.

In addition, a counter (not shown) for counting the word pulses to monitor how many data have been fed to the input terminal 41 is provided, and when the count value of this counter reaches a predetermined value and indicates that all the N input digital data $\{x_k\}$ ($k = 0, 1, \ldots, N-1$) have entered the digital filter, the switches 48-0 to 48-($m-1$) are closed. Then, the multiplier means 44-1 ~ 44-($m-1$) and the adder means 45 operate, and the result is derived from the output terminal 47. Thereafter, in response to the next word pulse, the counter is reset, and simultaneously, the switches 48-0 ~ 48-($m-1$) are opened, and the multiplier means 44-1 ~ 44-($m-1$) and the adder means 45 are brought into a rest state. Therefore, if necessary, the multiplier means 44-1 ~ 44-($m-1$) and the adder means 45 can be used for other computation purposes. Because the above-described control is not so important for explaining the essence of the present invention and it can be readily realized by means of well-known techniques, more detailed description and illustration are omitted.

Still further, the present arithmetic unit can take another structure. In FIG. 4, the coefficients multiplied in the ($m-1$) multiplier means 44-1, 44-2, ....., and 44-($m-1$) are $W^{-l}$, $W^{-2l}$, ..., and $W^{-(m-1)l}$, respectively, as will be obvious from equation (7). In order to multiply these coefficiets and accumulate the products, multiplication-addition operations could be carried out serially in place of the parallel execution as shown in FIG. 4.

In FIG. 6 which shows a second embodiment of the present invention operating in the above-described mode, at the left-hand portion of a switch 65 is equivalent to that of the dotted and dashed line in FIG. 4. The switch 65 is closed only during the period when the last $m$ data among the input digital data $\{x_k\}$ are fed to the input of a delay means 63 of $m$ stages of serially connected delay elements, and thereby an operation is carried out by a second recursive path consiting of an adder means 66, one-datum delay element 67, and a multiplier means 68 for multiplying a coefficient $W^{-l}$. This second recursive path performs an operation equivalent to the operation of FIG. 4 of multiplying the input signals to the m delay elements 43-1, 43-2, ..., and 43-m by $W^l$, $W^{-l}$, $W^{-2l}$..., and $W^{-(m-1)l}$, respectively, and of accumulating the products. The feature of the present unit shown in FIG. 6 is in that only one multiplier circuit is needed, and that there is no need to derive an output from the midway of the delays means 63 of m stages of serially connected delay elements.

In FIG. 7 which shows a third preferred embodiment of the present invention the Goertzel algorithm in FIG. 3 is applied to the operation at the right-hand portion of the switch 65 in FIG. 6. That is, a switch 75 is closed only the last $m$ times, while switches 80 and 81 are closed only once in the last operation. In the multiplier means 79, each of a supplied datum is multiplied by 2 cos ($2\pi l/N$), while in a multiplier means 83, the datum is multiplied by $W^{-l}$. In this embodiment, since the multiplication of a complex number by a real number is performed in the multiplier means 79 and the multiplication of a complex number by a complex number is performed only once in the last operation in the multiplier means 83 instead of performing the multiplications of complex numbers by complex numbers, the total number of multiplications is further reduced to about one-half in comparison to that of the embodiments shown in FIGS. 4 and 6.

The switches 48-0 ~ 48-(m-1) of FIG. 4 are connected to the input terminals of the delay elements 43-1 ~ 43-(m-1), respectively, but they can also be connected to the output terminals of the respective delay elements to perform equivalent operations by shifting the switch closing time. Similarly, while the switches 65 and 75 of FIGS. 6 and 7 are connected to the output terminals of the adder means 62 and 72, respectively, they can be connected to the output terminals of the multiplier means 64 and 74 to perform equivalent operations by shifting the switch closing time.

Though the present invention has been described above in connection to the multi-frequency receiver as one example of the DFT application, its application is not limited to such a case. For instance, for the purpose of voice recognition, the investigation of either existence or non-existence of particular frequency components in a voice signal is carried out, and for that purpose, the DFT is employed. In addition, the DFT is applicable to a very broad field of applications such as analysis of earthquake waves, analysis of brain waves, radar signal processing, etc.

Moreover, the present invention described above is a DFT arithmetic unit in which the constant $\alpha$ as referred to in the introductory part of this specification and in the appended claims takes the value $\alpha = W^{-l}$ as represented by equation (1), but the invention is not limited to such a case. The present invention can be applied to any case where the constant $\alpha$ takes other values. It is assumed now that the value of $$\alpha = \frac{1}{\sqrt[3]{2}}$$

is selected, a formula $$\sum_{k=0}^{N-1} x_k \alpha^{N-k}$$

is computed, and the input data series $\{x_k\}$ consists of real numbers. From the contrast of equation (4) with equation (5), it will be seen that the result of this operation is the output signal derived when all the input digital data have entered the recursive digital filter represented by the following transfer function:

$$H(Z) = \frac{1}{1 - \alpha Z^{-1}} \quad (11)$$

The digital filter represented by equation (11) has the same structure as that shown in FIG. 2, and the only differences that exist are that the coefficient multiplied by the multiplier means 25 is $\alpha$ rather than $W^{-l}$, and that the delay element 24, the adder means 22 and the multiplier means 25 are provided only for the real part since both of the data and the coefficient are real. In the circuit shown in FIG. 2, in order to perform this operation, the multiplication by $$\alpha = \frac{1}{\sqrt[3]{2}}$$

must be carried out N times.

Now, equation (11), can be modified into the following expression:

$$H(Z) = \frac{1 + \alpha Z^{-1} + \alpha^2 Z^{-2}}{1 - \alpha^3 Z^{-3}} \quad (12)$$

The digital filter represented by equation (12) consists of a recursive path represented by the denominator and an non-recursive path represented by the numerator, and since the desired result of the operation is the filter output when the input digital data series $\{x_k\}$ has entirely entered the digital filter represented by equation (12), the operation in the non-recursive path is required to be performed only once in the last operation. For this reason, if the digital filter is constructed as shown in FIG. 4, and if the number of stages of the delay elements is $m = 3$, the coefficient multiplied by the multiplier means 46 is equal to $\alpha^3 = \frac{1}{2}$. Here, it is to be noted that for multiplying a digital signal by $\frac{1}{2}$, an ordinary multiplier is unnecessary, but the operation can be realized with a 1-bit shift circuit. For instance, 0.25 is represented as 0.01 in binary expression while $\frac{1}{2} \times 0.25 = 0.125$ is represented as 0.001, so that in order to multiply by $\frac{1}{2}$, only a 1-bit shift is necessary. In other words, the multiplier means 46 need not be constructed with the ordinary multiplier, but a mere 1-bit shift circuit (flip-flop) is satisfactory. On the other hand, it is sufficient to carry out the multiplication in the non-recursive path which needs the ordinary multiplier once in the last operation, so that eventually the total number of multiplications is only two. In contrast to the fact that N multiplications are necessary in the case of the circuit of FIG. 2, only two multiplications are required in the case of the present unit of FIG. 4. As a result, if N = 100 is assumed, the number of multiplications can be reduced to 1/50. While the above-described example was explained with respect to the arithmetic unit shown in FIG. 4, it is a matter of course that a similar example can be practiced even with the arithmetic unit of FIG. 6. The above-described example employs a 1-bit shift circuit in place of the simplified multiplier means 46 in the DFT arithmetic unit of FIG. 4. In either case, the present invention is based on the basic concept that in an arithmetic unit for performing the operation of multiplying input data by successive powers of a constant in a descending order or in an ascending order and accumulating the products, a recursive path which does not necessitate a multiplier and operations which really necessitate multiplication are carried out only when the input data have substantially entered this recursive path, and therefore, the invention can widely reduce the number of multiplications in comparison to the prior art circuit and it is efficient in simplification, reduction in size, and increased speed of the apparatus.

Moreover, since the present unit is entirely composed of serial operation elements and the delay elements could be serial delay elements such as a shift register, the unit can be greatly simplified.

Although the present invention has been described above in conjunction with a number of embodiments, the invention is generally applicable to an arithmetic unit for performing an operation represented by $\sum_{k=0}^{N-1} x_k \alpha^{N-k}$ (where $\alpha$ is a constant) by changing the coefficients of the multiplications, and various modifications and alternatives may be made within the scope of the present invention defined by the appended claims.

I claim:

1. An arithmetic unit for performing the operation of multiplying in a predetermined order successive powers of a constant $\alpha$ by an N-point input digital data series $\{x_k\}$ ($k = 0, 1, 2, \ldots,$ N-1) and accumulating the products comprising:
    a first operation means consisting of
        an input terminal for receiving said input digital data series,
        one or more stages of serially connected delay elements,
        a first multiplier means connected to said one or more stages of serially connected delay elements for multiplying an output of said delay elements by a certain coefficient, and
        a first adder means having a first input connected to said input terminal fed with the input digital data series $\{x_k\}$ and a second input connected to the output of said first multiplier means, the output of said first adder means being connected to the input of said one or more stages of serially connected delay elements for every input digital data of the data series $\{x_k\}$; and
    a second operation means connected to the output of said first operation means for performing the operation of multiplying in another order predetermined depending on said predetermined order the successive powers of the constant $\alpha$ by outputs obtained from said one or more stages of serially connected delay elements of said first operation means when the input digital data series $\{x_k\}$ has been fed to said input terminal of the first operation means for performing the operation of accumulating the products.

2. An arithmetic unit as claimed in claim 1 wherein said one or more stages of serially connected delay elements consists of $m$ serially connected delay elements where $m > 1$, and said second operation means consists of a group of switches each having one end connected to an input terminal of the corresponding stage of the serially connected delay elements and adapted to be closed only when the input digital data series $(x_k)$ has been entirely fed to the input terminal of the first operation means; a group of multipliers connected to the other ends of said group of switches for multiplication of coefficients equal to the successive powers of the constant $\alpha$; and an adder means for adding outputs of the group of the group of multipliers.

3. An arithmetic unit as claimed in claim 1 in which said second operation means consists of
    a switch having its one end connected to the output of said first adder means and adapted to be closed only when the last $m$ input digital data, where $m \leq N$, have been fed to said input terminal of said first operation means;
    a second one-stage delay element;
    a second multiplier means connected to said second one-stage delay element for multiplying the output of said second one-stage delay element by the constant $\alpha$; and
    a second adder means having a first input connected to the other end of said switch and a second input connected to the output of said second multiplier means, the output of said second adder means being connected to the input of said second one-stage delay element.

4. An arithmetic unit as claimed in claim 1 in which said second operation means consists of
a switch having its one end connected to the output of said first adder means and adapted to be closed only when the last $m$ input digital data, where $m \leq N$, have been fed to said input terminal of said first operation means;
first and second serially connected delay elements;
second multiplier means connected to said first delay element for multiplying the output of said first delay element by a real number coefficient;
a second adder means having a first input connected to the other end of said switch, a second input connected to the output of said second multiplier means and a third input obtained by inverting the polarity of the output of said second delay element, the output of said second adder means being connected to the input of said first delay element;
second and third switches connected to the output of said second adder means and the output of said first delay element, respectively, and adapted to be closed only when the input digital data series $\{x_k\}$ has been entirely fed to the input terminal of the first operation means;
a third multiplier means connected to the other end of said third switch for the multiplication of a complex conjugate of the constant $\alpha$; and
a third adder means having a first input connected to the other end of the second switch and a second input connected to the output of said second multiplier means.

5. An arithmetic unit as claimed in claim 1 wherein said certain coefficient is $+1$ and in which said first multiplier means in the first operation means comprises wire connections for passing multiplicand data without any change from input to output of said multiplier means.

6. An arithmetic unit as claimed in claim 1 wherein said certain coefficient is $-1$ and in which said first multiplier means in the first operation means comprises polarity inverters to invert multiplicand data passed from the input to the output of said first multiplier means.

7. An arithmetic unit as claimed in claim 1 wherein said certain coefficient is $+j$ and in which said first multiplier means in the first operation means comprises first means for passing the real part of the input of each multiplicand to the output port representing the imaginary part of the product and second means for inverting and passing the imaginary part of the input multiplicand to the output terminal representing the real part of the product.

8. An arithmetic unit as claimed in claim 1 wherein said certain coefficient is $-j$ and in which said first multiplier means in the first operation means comprises a first means for passing and inverting the real part of the input multiplicand to a terminal representing the imaginary part of the product and second means for passing without any change the imaginary part of the input multiplicand to a terminal representing the real part of the product.

* * * * *

UNITED STATES PATENT AND TRADEMARK OFFICE
CERTIFICATE OF CORRECTION

PATENT NO. : 4,080,661
DATED : March 21, 1978
INVENTOR(S) : Kunihiko NIWA

It is certified that error appears in the above-identified patent and that said Letters Patent are hereby corrected as shown below:

IN THE SPECIFICATION:

Column 1, line 4 - Insert -- BACKGROUND OF THE INVENTION -- line 20 - after "multi" insert -- - --

Column 7, line 29 - delete "$W^{-(m-1)1}$" insert --$W^{-(m-1)1}$ --
line 47 - after "operation" delete "of" insert -- in Column 9, line 2 - after "(11)" delete ","

Signed and Sealed this

Nineteenth Day of September 1978

[SEAL]

Attest:

RUTH C. MASON
Attesting Officer

DONALD W. BANNER
Commissioner of Patents and Trademarks